May 12, 1970     F. M. WILLIAMSON     3,511,073
HYDRAULIC DIE CONTROL STRUCTURE
Filed Sept. 20, 1965
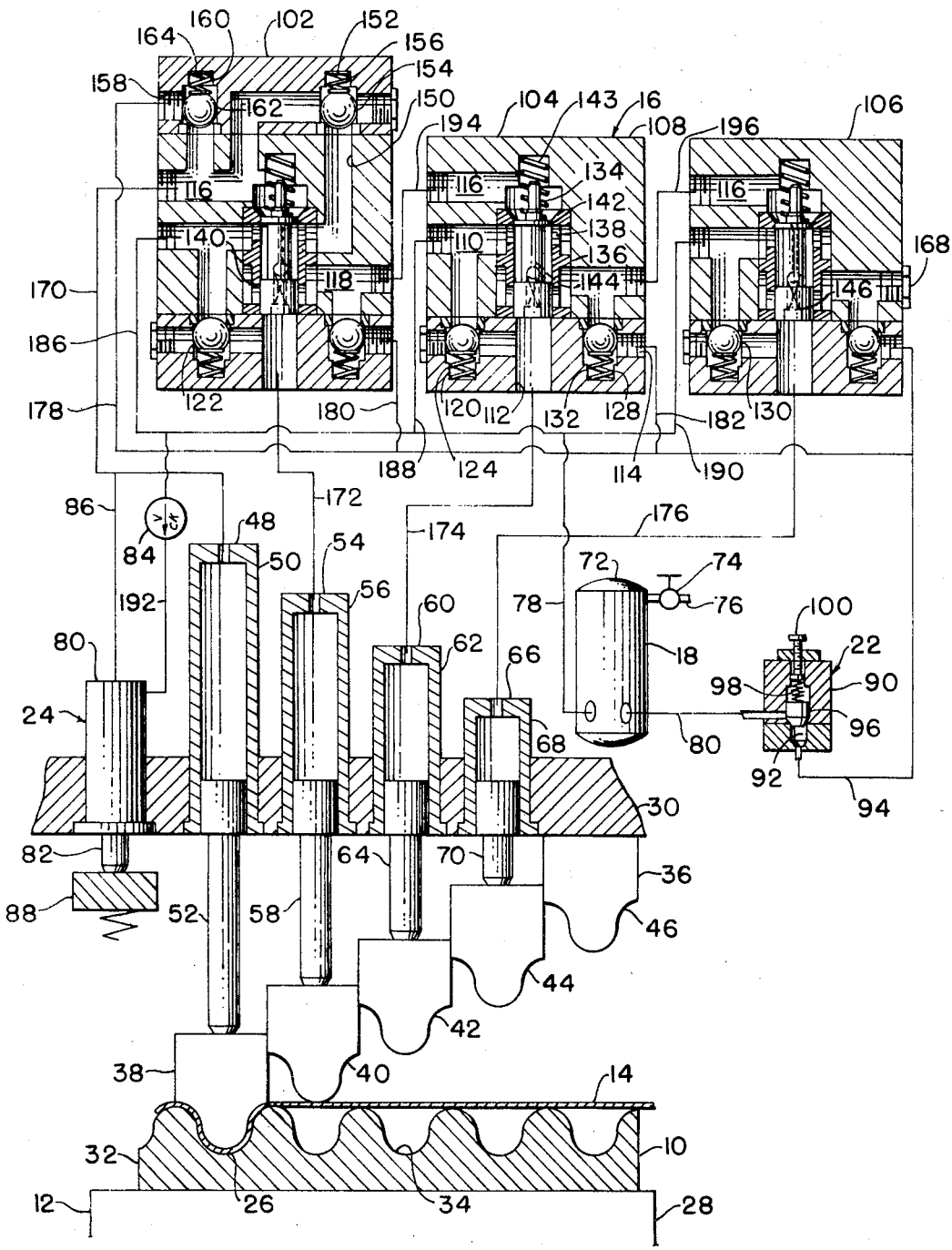
INVENTOR.
FLOYD M. WILLIAMSON
BY *Whittemore,*
*Hulbert & Belknap*
ATTORNEYS United States Patent Office 3,511,073
Patented May 12, 1970

3,511,073
HYDRAULIC DIE CONTROL STRUCTURE
Floyd M. Williamson, Detroit, Mich., assignor to Di-Dro Engineering Company, Detroit, Mich., a corporation of Michigan
Filed Sept. 20, 1965, Ser. No. 488,674
Int. Cl. B21d 13/02
U.S. Cl. 72—384                                           11 Claims

ABSTRACT OF THE DISCLOSURE

Structure for and a method of forming a corrugated member in a single press operation. The structure includes a plurality of separate die parts for forming separate corrugations in a workpiece secured to a press and means operably associated with the die parts and press for actuating the die parts in sequence to form separate corrugations in the workpiece in sequence outwardly from a first formed corrugation therein. Separate hydraulic cushions are provided in contact with each of the die parts and means are included for preloading each of the hydraulic cushions immediately before the die part engaged therewith forms a corrugation in the workpiece and for releasing pressure on the hydraulic cushion engaged with a die part immediately adjacent the die part next to a die part by which the next corrugation is to be formed.

The method of producing a corrugated die formed member disclosed includes forming a first corrugation in a workpiece by means of a first die part, maintaining the pressure on the first die part while forming a second corrugation adjacent the first corrugation in the workpiece immediately adjacent the first corrugation, maintaining pressure on the second part after the second corrugation is produced and producing subsequent corrugations in the workpiece by separate die parts sequentially while maintaining pressure on the die part immediately adjacent the corrugation being formed. The method further includes the steps of releasing the pressure on the die part which formed the corrugation immediately adjacent the corrugation next to a corrugation to be formed and preloading each of the die parts prior to forming a corrugation therewith in response to movement of the die part forming the immediately preceding corrugation when the immediately preceding corrugation has been fully formed.

Unique valve structure is also disclosed for forming a corrugated member in accordance with the method and by the structure of the invention, including a valve block having a first low pressure hydraulic fluid inlet passage, a second hydraulic fluid passage, a check valve operable between the first and second passages for permitting fluid flow only in the direction of the second passage from the first passage, a third preload hydraulic fluid inlet passage, a spool valve positioned between the second and third passages responsive to pressure in the second passage for providing communication between the first and third passages, a fourth preload hydraulic fluid outlet passage, said spool valve also being responsive to the pressure in the second passage for providing communication between the second passage and the fourth passage, a fifth high pressure hydraulic fluid outlet passage and a check valve between the fourth and fifth passages permitting fluid flow only in the direction of the fifth passage from the fourth passage.

In the past corrugated members have usually been produced in separate forming steps which are inefficient of press equipment and operator time. Wherein it has been attempted in the past to produce corrugated members in a single press operation, the material of the corrugated members has often been torn or deformed due to material flow involved in the corrugation process. In addition, in the past the forming of corrugated members has required the movement of high volumes of hydraulic fluid and presses having an extremely high pressure capability both of which requirements are undesirable.

It is, therefore, one of the objects of the present invention to provide improved hydraulic control structure for use in producing corrugated members or the like in a single press operation.

Another object is to provide an improved method of producing corrugated members or the like in a single press operation.

Another object is to provide improved control valve structure for use in forming corrugated members in a single press operation or the like.

Another object is to provide structure for producing corrugated members in a single press operation including a separate die part for each corrugation adapted to be sequentially actuated, a separate hydraulic cushion associated with each die part except the last and hydraulic control valve structure for actuating each of the hydraulic cushions sequentially as the individual corrugations are sequentially formed in a member to be corrugated by the separate die parts.

Another object is to provide structure as set forth above wherein the control valve structure includes means for providing an initial preload on each of the hydraulic cushions immediately prior to the forming of a corrugation with the die part associated therewith during the single press operation.

Another object is to provide structure as set forth above wherein the control valve structure includes means for releasing the hydraulic pressure on the hydraulic cushion associated with a die part immediately adjacent the die part next to a corrugation to be formed during the single press operation.

Another object is to provide a method of forming a corrugated member in a single press operation comprising forming individual corrugations in the corrugated member sequentially outwardly from an initial corrugation which is held stationary as the subsequent corrugations are formed.

Another object is to provide a method as set forth above including forming the corrugations with separate die parts and preloading the separate die parts sequentially immediately before a corrugation is formed thereby.

Another object is to provide a method as set forth above and further including the step of relieving the pressure on the die part immediately adjacent a die part next to a corrugation to be formed for the rest of the single press operation.

Another object is to provide structure for and a method of forming a corrugated member in a single press operation which is simple, economical, and efficient.

Other objects and features of the invention will become apparent as the description proceeds, especially when taken in conjunction with the accompanying drawings, illustrating a preferred embodiment of the invention, wherein:

The figure is a diagrammatic representation of die structure mounted in a press and a hydraulic press control system constructed in accordance with the invention operably connected thereto for producing a corrugated member thereby in a single press operation.

With particular reference to the figures of the drawing, one embodiment of the present invention will now be disclosed in detail.

As illustrated in the figure a die set 10 is mounted on a press 12 for forming a flat work piece 14 into a corrugated member. The die set 10 is under the control of the hydraulic press control system 16 which includes the hydraulic cushions 48, 54, 60 and 66 connected to the source of hydraulic fluid under pressure 18 through the die control valve structures 102, 104 and 106. Separate pressure relief structure 22 and preload structure 24 are also provided in accordance with the invention as part of the hydraulic press control system.

In operation, the press 12 is operated once and the die set 10 forms corrugations in the workpiece 14 sequentially from corrugation 26 illustrated in the drawing. The entire workpiece 14 is corrugated in a single operation of the press 12.

More specifically, the press 12 includes the lower platen 28 which may be secured to a press bed not shown and the upper platen 30 which may be secured to a ram also not shown. As will be understood by those in the art, the upper and lower platens are moved toward each other by press actuating mechanism not shown and are capable of exerting high pressure on a workpiece 14 positioned between the upper and lower die members of the die set 10 which are positioned between and secured to the platens by convenient means such as bolts, bias springs and guide members, not shown.

The die set 10 includes the lower one piece die member 32, the upper surface 34 of which is formed in the corrugated shape which it is desired to impart to a finished workpiece 14. The upper die member 36 includes the separate die parts 38, 40, 42, 44 and 46. The die part 46 may be secured to the upper platen 30 of the press 12 by convenient means such as bolts, not shown. The separate die parts 38, 40, 42 and 44 are carried by the upper platen 30 of the press 12 and are resiliently urged downwardly from the upper platen 30 into an extended position as shown in the drawing by convenient means such as bolts secured to the die parts 38, 40, 42 and 44, and extending upwardly through the upper platen 30 to provide a limit on the extended position of the die parts 38, 40, 42 and 44 and associated springs for urging the die parts 38, 40, 42 and 44 into the extended position shown. The structure connecting the die parts 38, 40, 42 and 44 to the upper platen 30 as described is conventional and therefore is not shown nor will it be considered in greater detail herein.

The die parts 38, 40, 42 and 44 have associated therewith hydraulic cushion structure 48 including a cylinder 50 and piston 52, hydraulic cushion structure 54 including a cylinder 56 and a piston 58, hydraulic cushion structure 60 including a cylinder 62 and piston 64, hydraulic cushion structure 66 including cylinder 68 and piston 70 respectively. As illustrated the hydraulic cushion structures 48, 54, 60 and 66 are carried by the upper platen 30 of the press 12. Also it will be noted that the pistons 52, 58, 64 and 70 respectively will engage the die parts 38, 40, 42 and 44 of the upper die member 36 of the die set 10.

The hydraulic cushions 48, 54, 60 and 66 are individually connected to the source of hydraulic fluid under pressure 18 through the die control valve structures 102, 104 and 106. The source of hydraulic fluid under pressure includes the hydraulic fluid tank 72 in which hydraulic fluid under pressure determined by the pressure regulator 74 in hydraulic fluid supply line 76 is maintained. The pressure in the hydraulic fluid tank 72 may be maintained at a pressure of, for example, 100 lbs. per square inch. A low pressure hydraulic fluid supply line 78 extends from the tank 72 while a hydraulic fluid high pressure return line 80 is connected between the pressure relief structure 22 and the tank 72.

The separate preload structure 24 includes a cylinder 80 and the piston 82. The cylinder 80 is connected through the check valve 84 and hydraulic fluid lines 192, 186 and 78 to the tank 72 so that hydraulic fluid under pressure in the tank 72 is supplied to the cylinder 80 with the press in an open position to extend the piston 82. The cylinder 80 is also connected by hydraulic lines 86 and 170 to the hydraulic cushion 48 for supplying preload hydraulic fluid at relatively high pressure to the cylinder 50 on contact of the piston 82 with a fixed abutment 88 during downward movement of the upper platen 30 of the press 12. The abutment 88 may be biased to move after the preload function of structure 24 has been served or the piston 82 and cylinder 80 may be of a size to permit required movement of the platen 30 to form the complete workpiece 14.

The pressure relief structure 22 includes a valve body block 90 having a passage 92 therein connected at one end to the hydraulic line 94 and to the hydraulic fluid line 80 at the other end. The valve 96 in passage 92 is urged by spring 98 into closing relation to the passage 92 until sufficient pressure is present in the hydraulic line 94 to force the valve 96 open against the pressure of the spring 98 at which time fluid in line 94 will be returned to the tank 72 through line 80. The pressure relief structure 22 may be set to provide opening of the valve 96 at definite predetermined pressures by adjustment of the screw 100 provided in conjunction therewith.

The die control valve structures 102, 104 and 106 are substantially the same. Therefore, only the valve structure 104 will be considered in detail herein. The differences between the valve structure 104 and the valve structures 102 and 106 will then be pointed out.

The valve structure 104 includes a valve body block 108 having a first, low pressure fluid inlet passage 110; a second, hydraulic cushion fluid inlet and outlet passage 112; a third, preload fluid inlet passage 116; a fourth, preload fluid outlet passage 118; and a fifth, high pressure fluid outlet passage 114 therein connected as shown in the figure. Check valve structure 120 including the ball valve 122 and the bias spring 124 is provided in the valve body block 108 between the low pressure fluid inlet passage 110 and the hydraulic cushion fluid inlet and outlet passage 112. Valve structure 120 permits fluid flow only in the direction of the hydraulic cushion fluid inlet and outlet passage 112 from the low pressure fluid inlet passage 110.

The valve body block 108 further includes the check valve structure 128 including the ball valve 130 and the biasing spring 132. The valve structure 128 functions to permit fluid flow only from the preload fluid outlet passage 118 in the direction of the high pressure fluid outlet passage 114.

Spool valve structure 134, including the cylindrical valve housing 136 having the transverse hydraulic fluid ports 138 and 140 extending therethrough, the spool valve 142 and the biasing spring 144, is positioned between the passages 112 and 116 as illustrated in the drawing. The spool valve 142 includes a preload fluid orifice 144 extending axially therethrough having the check valve 146 therein for permitting flow therethrough only in the direction of passage 112 from the passage 116.

In operation, when the spool valve 142 moves into its open or upper position against the bias of spring 144, the passages 116 and 110 are placed in communication through the ports 138 in the valve housing 136. Also at this time the passage 112 is placed in communication with the passage 118 through the ports 140 in the valve housing 136.

The valve structure 102 differs from the valve structure 104 in that the low pressure input passage 110 is connected to the preload fluid inlet passage 116 through a sixth passage 150 partly in valve body block 108 and partly in the valve body block 151 connected to the valve body block 108. The check valve structure 152 including the valve member 154 and spring 156 is positioned in the passage 150. Valve structure 152 permits fluid flow only in a direction from the passage 150 into the passage 116.

In addition, the valve structure 102 includes a seventh, high pressure fluid outlet passage 158 in the valve body block 108 connected through check valve structure 160 to the passage 116. The valve structure 160 includes the ball valve 162 and the biasing spring 164. Valve structure 160 permits fluid flow only in the direction of the passage 158 from the passage 116.

The valve structure 106 differs from the valve structure 104 only in that the passage 118 is plugged by means of the plug 168. The valve structures 102 and 106 differ from the valve structure 104 because they are connected to the first hydraulic cushion 48 in the series of cushions 48, 54, 60 and 66 and the last hydraulic cushion 66 in the series respectively.

The valve structures 102, 104 and 106 are connected to the hydraulic cushions 48, 54, 60 and 66 by the hydraulic fluid lines 170, 172, 174 and 176 as illustrated in the figure. The passages 158, and 114 of the valve structures 102, 104 and 106 are connected to the pressure relief structure 22 through the hydraulic lines 178, 180, 182 and 94, also as shown in the drawing. The passages 110 of the valve structures 102, 104 and 106 are connected to the hydraulic fluid line 78 from tank 72 through the hydraulic fluid lines 186, 188 and 190. The check valve 84 is connected to the hydraulic fluid line 186 and the preload structure 24 through conduit 192 while the cylinder 80 is connected to line 170 through line 86 as set forth above. Passage 118 of valve structure 102 is connected to passage 116 of valve structure 104 through hydraulic fluid line 194 and passage 118 of valve structure 104 is connected to passage 116 of valve structure 106 through hydraulic fluid line 196. The detailed operation of the valve structures 102, 104 and 106 will be considered in conjunction with a cycle of operation of the press 12.

At the start of each cycle of operation of the press 12, the upper platen 30 is separated from the lower platen 32 so that the piston 82 of the preload structure 24 is extended and the cylinder thereof is filled with hydraulic fluid. Each of the hydraulic cushion structures 48, 54, 60 and 66 is fully extended as shown and the check valves and spool valves in the valve structures 102, 104 and 106 are in a closed position as shown in the figure as is the pressure relief valve structure 22.

A flat metal workpiece 14 which it is desired to corrugate is then placed on the lower die member 32 of the die set 10 and the upper platen 30 of the press 12 is moved downward toward the lower platen 28. On downward movement of platen 30, the piston 82 of the preload structure 24 first engages the abutment 88 so that hydraulic fluid from the cylinder 80 is forced through line 86 and line 170 into the cylinder 50 of the hydraulic cushion 48 to provide an initial preload pressure in the hydraulic cushion 48 sufficient so that on engagement of the workpiece 14 to be corrugated by the die part 38 the workpiece will be formed as shown in the figure before the piston 52 of the hydraulic cushion 48 is moved upward in the cylinder 50.

The preload pressure is determined by the check valve 162 and the pressure relief structure 22. Thus, should the preload pressure exceed a predetermined value, the check valve 162 will be opened so that the hydraulic fluid from the cylinder 80 will pass into passage 116 and out of the valve structure 102 through passage 158, lines 178 and 94 to the pressure relief structure 22 from which it will be returned to the tank 72.

After the first corrugation 26 has been formed in the workpiece 14, as the upper platen 30 of the press 12 continues to descend, the piston 52 of the hydraulic cushion 48 will be forced into the cylinder 50. The hydraulic fluid in the cylinder 50 will thus be forced through line 170 into the passage 116 to provide preload hydraulic fluid under pressure through the axial orifice 144 in spool valve 142 past the check valve 146 and into line 172 to the hydraulic cushion 54. Any excess hydraulic fluid forced from cylinder 50 will again be passed through the check valve 160, lines 178 and 94 and pressure relief structure 22 back to the tank 72.

At this time pressure is maintained on die part 38 and as the platen 30 continues its downward movement the die part 40 in engagement with the piston 58 under pressure of the hydraulic fluid in the cylinder 56 will engage the workpiece 14 to form a second corrugation therein adjacent the first corrugation 26. When the second corrugation is completely formed the piston 58 will be moved upwardly in the cylinder 56 forcing the hydraulic fluid out of the cylinder 56 through the line 172.

The hydraulic fluid in the line 172 will enter the passage 112 to cause the check valve 146 to close. The spool valve 142 is then moved upwardly against the bias of the spring 144 due to pressure in the passage 112. Upward movement of the spool valve 142 provides communication between the passage 116 and the passage 110 whereby the pressure in the preload cylinder 80 and the cylinder 50 of hydraulic cushion 48 is released due to free flow of the hydraulic fluid through lines 186 and 78 back to tank 72.

Upward movement of the spool valve 142 of valve structure 102 further provides communication between the passage 112 and the passage 118. Hydraulic fluid is thus passed from the cylinder 56 through line 172 into passage 112 past the spool valve 142 into the passage 118 and through line 194 into the hydraulic fluid passage 116 in valve structure 104.

The hydraulic cushion 60 is thus provided with preload hydraulic fluid pressure through the passage 116, orifice 144 in spool valve 142 past check valve 146 through passage 112 and line 174. The hydraulic pressure is thus maintained in the hydraulic cushion 54 and applied to the next hydraulic cushion 60. Any excess hydraulic fluid from the cylinder 54 is bypassed back to the pressure relief structure 22 through the check valve 128, passage 114, and lines 180, 178 and 94.

As the platen 30 continues in its downward movement, the die part 42 engages the workpiece 14 to be corrugated and forms a third corrugation therein. After complete forming of the third corrugation the piston 64 of hydraulic cushion 60 is forced upwardly in the cylinder 62 whereby hydraulic fluid is forced upwardly through the line 174.

At this time the spool valve 142 of the valve structure 104 is moved upwardly to connect the passage 116 with the passage 110 and relieve the pressure in the hydraulic cushion 54 whereby the spool valve 142 in valve control structure 102 closes. Opening of the spool valve 142 in valve structure 104 permits hydraulic fluid from the cylinder 62 to pass through line 174 passage 112 through port 140 in the valve structure 104 and into passage 118 of the valve structure 104 from whence it passes through line 196 into passage 116 of the valve structure 106 with the excess fluid passing through check valve 128 through passage 114 and lines 182, 178 and 94 through the pressure relief structure 22 back to tank 72.

In a similar manner the hydraulic cushion 66 is preloaded through the spool valve 142 of the valve structure 106 and after a fourth corrugation is formed in the workpiece 14, the piston 70 is forced upwardly in the hydraulic cushion 66 to open the spool valve 142 in the valve structure 106 to relieve the pressure on the hydraulic cushion 60 and return the hydraulic fluid from the cushion 66 through check valve 128 and passage 114 through line 94 and the pressure relief structure 22 to tank 72. The plug 168 is provided in the passage 118 in the valve structure 106 since valve structure 106 is the last valve structure in the series of valve structures and the die part 46 needs no preloading as it is connected directly to the platen 30.

On continued downward movement of the platen 30, the die part 46 forms the fifth and last corrugation in the workpiece 14. The platen 30 is then moved upward away from the platen 28.

On upward movement of the platen 30, each of the die parts 46, 44, 42, 40 and 38 are returned to the position illustrated in the drawing relative to the platen 30 and the piston 82 of the preload structure 24 is again extended. The cushions 54, 60 and 66 are again filled with hydraulic fluid from the tank 72 through the line 78, lines 186, 188 and 190, passages 110, check valves 120, passages 112 and lines 172, 174 and 176. The hyhydraulic cushion 48 and the preload structure 24 are again filled with hydraulic fluid from the tank 72 through the line 78, line 186, passage 110, passage 150, check valve 152, passage 116, conduit 170 and conduit 86.

Thus, a single cycle of operation of the press 12 is completed and the workpiece 14 has been formed into a corrugated member. Further, the hydraulic press control system 16, the die set and press structure are in a position for another cycle of operation.

It will be particularly noted that in the single cycle of operation of the press 12 the hydraulic pressure is relieved from those die parts immediately adjacent the die part next to the corrugation to be formed whereby only one die part maintains pressure to hold the workpiece so that it is drawn into the die set from only one side during the forming of each separate corrugation. Lower overall press pressure is thus required in forming a corrugated member and tearing of the member to be corrugated is less likely to occur than if it were attempted to make all of the corrugations at once. Also, the time consuming process of making each corrugation in a separate cycle of the press is eliminated.

While one embodiment of the present invention has been considered in detail, it will be understood that other embodiments and modifications thereof are contemplated. Thus it would be entirely possible to form a corrugated member having many more corrugations therein by adding additional associated die parts, hydraulic cushions and valve structures. In addition, it would of course be possible to provide associated die parts, hydraulic cushions and valve structures symmetrical with the die parts 40, 42, 44 and 46 and their associated hydraulic cushions and valve structures at the left of the die member 38 whereby the first corrugation to be made in a member would be the center corrugation and pairs of corrugations would be formed in a workpiece 14 proceeding outwardly on both sides of the die part 38 in a single cycle of the press 12. It is the intention to include all embodiments and modifications as are defined by the appended claims within the scope of the invention.

What I claim as my invention is:

1. Structure for forming a corrugated member in a single press operation comprising a plurality of separate die parts for forming separate corrugations in a workpiece secured to a press and hydraulic control structure operably associated with the die parts and press for actuating the die parts to form separate corrugations in the workpiece in sequence outwardly from a first formed corrugation therein including separate hydraulic cushions in contact with each of the die parts and means for preloading each of the hydraulic cushions immediately before the die part engaged therewith forms a corrugation in the workpiece.

2. Structure for forming a corrugated member in a single press operation comprising a plurality of separate die parts for forming separate corrugations in a workpiece secured to a press, hydraulic control structure operably associated with the die parts and press including separate hydraulic cushions in contact with each of the die parts for actuating the die parts to form separate corrugations in the workpiece in sequence outwardly from a first formed corrugation therein and means for releasing the pressure on the hydraulic cushion engaged with a die part immediately adjacent the die part next to the die part by which the next corrugation is to be formed.

3. Structure as set forth in claim 1 wherein the means for preloading each of the hydraulic cushions after the first hydraulic cushion includes the last preceding preloaded hydraulic cushion.

4. Structure as set forth in claim 1 wherein the means for preloading the first hydraulic cushion comprises a separate preloading cylinder for forcing hydraulic fluid at a predetermined pressure into the first hydraulic cushion before the first die part engages the workpiece.

5. Structure as set forth in claim 1 and further including means for releasing the pressure on the hydraulic cushion engaged with a die part immediately adjacent the die part next to the die part by which the next corrugation is to be formed.

6. Structure as set forth in claim 2 wherein the means for releasing the pressure on the hydraulic cushion engaged with a die part immediately adjacent the die part next to the die part by which the next corrugation is to be formed comprises a spool valve, means for actuating the spool valve in response to the hydraulic pressure in the hydraulic cushion engaged with the die part next to the die part by which the next corrugation is to be formed and pressure relief means for the hydraulic cushion engaged with the die part immediately adjacent the die part next to the die part by which the next corrugation is to be formed operable in response to actuation of the spool valve.

7. The method of producing a corrugated die formed member in a single press operation comprising actuating separate hydraulic cushions in contact with separate die parts to form separate corrugations in the workpiece in sequence outwardly from a first formed corrugation therein and preloading each of the hydraulic cushions immediately before the die part engaged therewith forms a corrugation in the workpiece.

8. The method as set forth in claim 7 wherein each of the hydraulic cushions after the first hydraulic cushion is preloaded from the last preceding preloaded hydraulic cushion.

9. The method as set forth in claim 7 wherein the first hydraulic cushion is preloaded from a separate preloading cylinder.

10. The method as set forth in claim 7 and further including the step of releasing the pressure on the hydraulic cushion engaged with a die part immediately adjacent the die part next to the die part by which the next corrugation is to be formed.

11. The method of producing a corrugated die formed member comprising actuating separate hydraulic cushions in contact with separate die parts for forming separate corrugations in a workpiece in sequence outwardly from a first formed corrugation therein and releasing the pressure on the hydraulic cushion engaged with a die part immediately adjacent the die part next to the die part by which the next corrugation is to be formed.

References Cited

UNITED STATES PATENTS

| | | | |
|---|---|---|---|
| 1,431,175 | 10/1922 | Ogden et al. | 72—404 |
| 2,954,068 | 9/1960 | Williamson | 72—403 |

LOWELL A. LARSON, Primary Examiner

U.S. Cl. X.R.

72—403